(12) United States Patent
Churchill et al.

(10) Patent No.: US 8,022,691 B2
(45) Date of Patent: Sep. 20, 2011

(54) MICROMINIATURE GAUGING DISPLACEMENT SENSOR

(75) Inventors: David L. Churchill, Burlington, VT (US); Steven Ward Mundell, Richmond, VT (US)

(73) Assignee: Microstrain, Inc., Williston, VT (US)

( * ) Notice: Subject to any disclaimer, the term of this patent is extended or adjusted under 35 U.S.C. 154(b) by 902 days.

(21) Appl. No.: 10/677,578

(22) Filed: Oct. 2, 2003

(65) Prior Publication Data
US 2004/0129095 A1 Jul. 8, 2004

Related U.S. Application Data

(60) Provisional application No. 60/415,352, filed on Oct. 2, 2002.

(51) Int. Cl.
*G01B 7/14* (2006.01)
*H01F 5/00* (2006.01)

(52) U.S. Cl. .............. 324/207.18; 324/207.24

(58) Field of Classification Search ............ 324/207.18, 324/207.19, 207.13, 207.15, 207.11, 207.16, 324/207.24, 176, 160, 164, 207.23, 207.14, 324/207.17; 200/329; 336/110, 130, 136; 33/1 M, 1 LE, 710, 556, 559, 558; 73/514.31; 318/657
See application file for complete search history.

(56) References Cited

U.S. PATENT DOCUMENTS

| | | | | | |
|---|---|---|---|---|---|
| 2,417,097 | A | * | 3/1947 | Warshaw | 336/30 |
| 3,221,281 | A | * | 11/1965 | Roeger | 336/30 |
| 3,624,684 | A | * | 11/1971 | McCaslin | 33/124 |
| 4,347,492 | A | * | 8/1982 | Davis et al. | 336/136 |
| 4,400,884 | A | * | 8/1983 | Baresh et al. | 33/552 |
| 4,406,999 | A | * | 9/1983 | Ward | 340/870.31 |
| 4,543,732 | A | * | 10/1985 | Maples | 324/207.18 |
| 4,616,420 | A | * | 10/1986 | Golinelli | 33/558 |
| 5,414,940 | A | * | 5/1995 | Sturdevant | 33/559 |
| 5,497,147 | A | | 3/1996 | Arms | |
| 5,642,043 | A | * | 6/1997 | Ko et al. | 324/207.24 |
| 5,777,467 | A | * | 7/1998 | Arms et al. | 324/207.18 |
| 6,356,072 | B1 | * | 3/2002 | Chass | 324/207.2 |
| 6,469,500 | B1 | * | 10/2002 | Schmitz et al. | 324/207.16 |
| 6,519,864 | B1 | * | 2/2003 | Jones et al. | 33/572 |

(Continued)

FOREIGN PATENT DOCUMENTS
JP 63241401 * 10/1988

*Primary Examiner* — Kenneth J Whittington
(74) *Attorney, Agent, or Firm* — James Marc Leas

(57) ABSTRACT

A device for providing displacement information includes a housing holding a displacement sensor. The displacement sensor includes a coil and a captive core. An electrical measurement of the coil provides information about displacement of the core. The coil has an axis extending in a first direction, wherein the housing has a minimum outside dimension that is less than 3.00 mm when measured perpendicular to that first direction. The housing has an inner surface having a housing inside dimension. The housing is for holding a displacement sensor and a guidance mechanism. The displacement sensor includes a coil and a captive core having a core outside dimension. The guidance mechanism includes a first part and a second part for guiding the core. The first part includes a bearing connected to the housing. The bearing has an axial hole having a hole dimension about equal to the core outside dimension. The core slidably extends through this axial hole. The second part has a second part outside dimension about equal to the housing inside dimension. The guidance mechanism is for resisting lateral movement and lateral rotation of the core while allowing axial movement of the core into and out of the coil.

51 Claims, 5 Drawing Sheets

U.S. PATENT DOCUMENTS

| | | | |
|---|---|---|---|
| 6,573,708 B1 * | 6/2003 | Hiramatsu et al. | 324/207.17 |
| 6,580,264 B2 * | 6/2003 | Nekado | 324/207.16 |
| 6,654,705 B1 * | 11/2003 | Benson et al. | 702/168 |
| 6,710,592 B2 * | 3/2004 | Hiramatsu et al. | 324/207.18 |
| 6,753,686 B2 * | 6/2004 | Tsuboi | 324/547 |
| 6,760,980 B1 * | 7/2004 | Golinelli | 33/832 |
| 2002/0153982 A1 * | 10/2002 | Jones et al. | 335/220 |

* cited by examiner

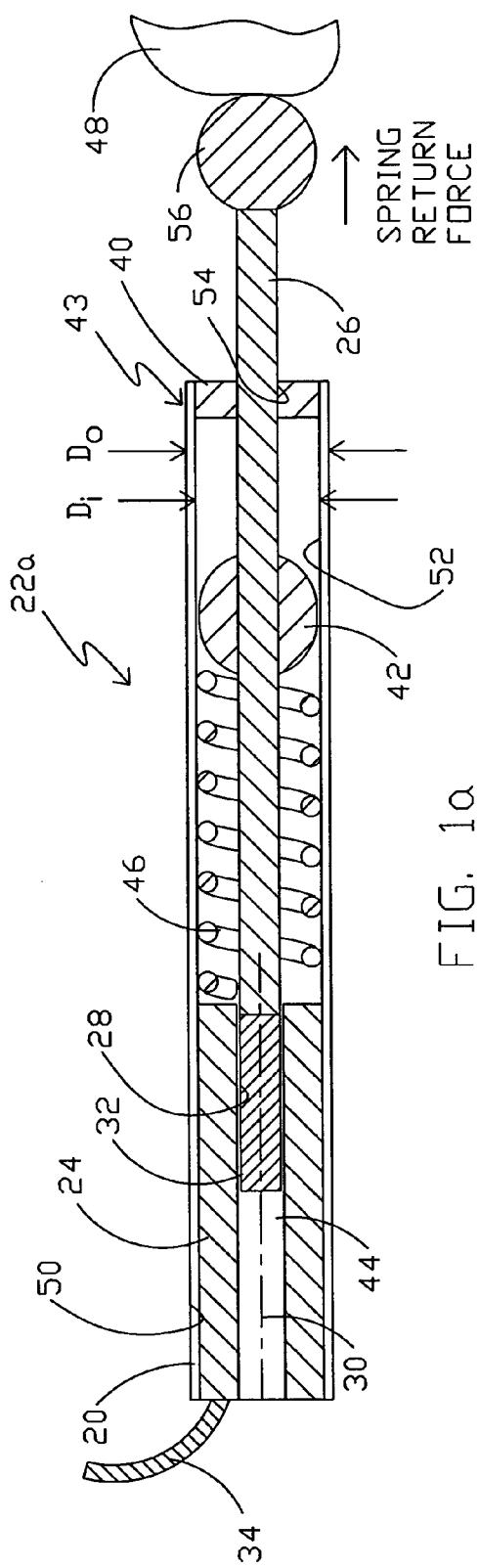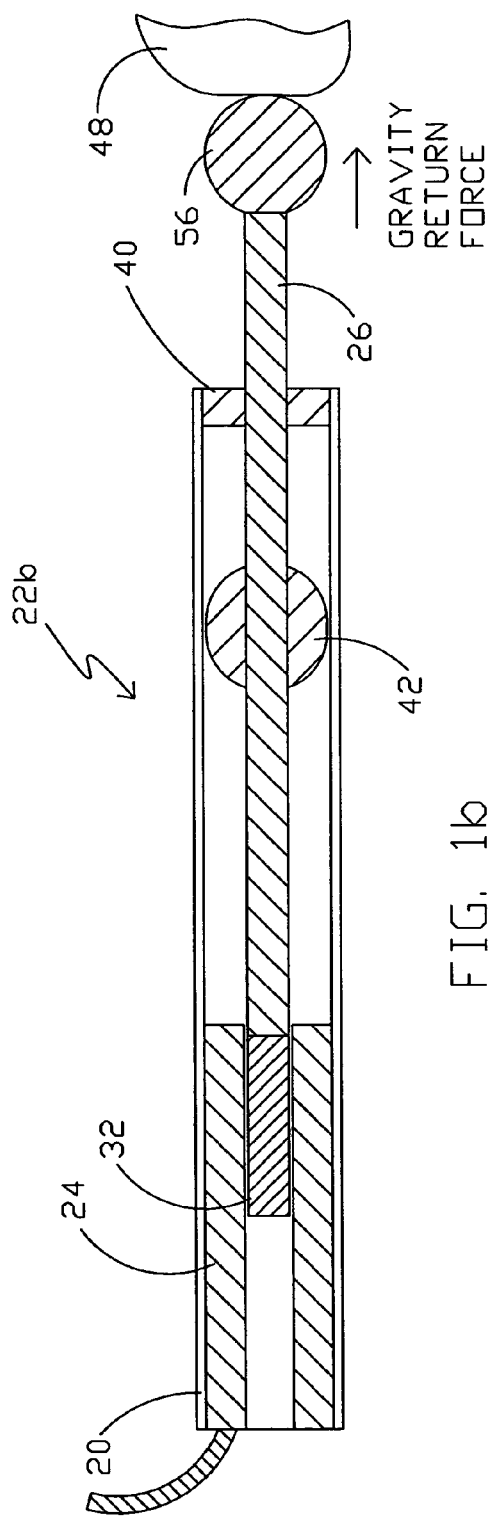
FIG. 1a
FIG. 1b

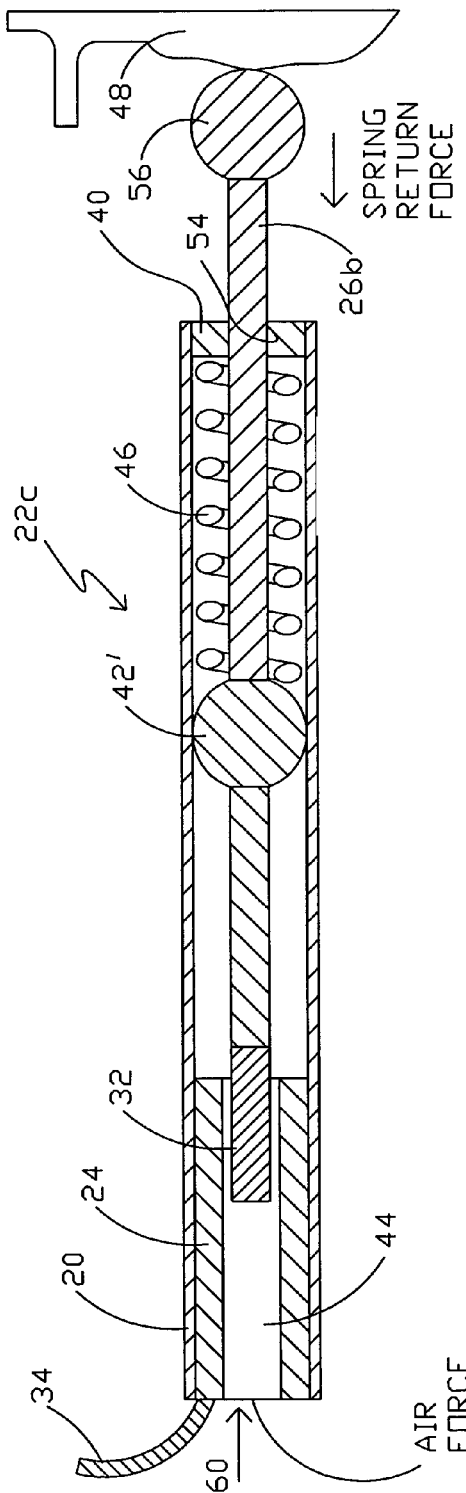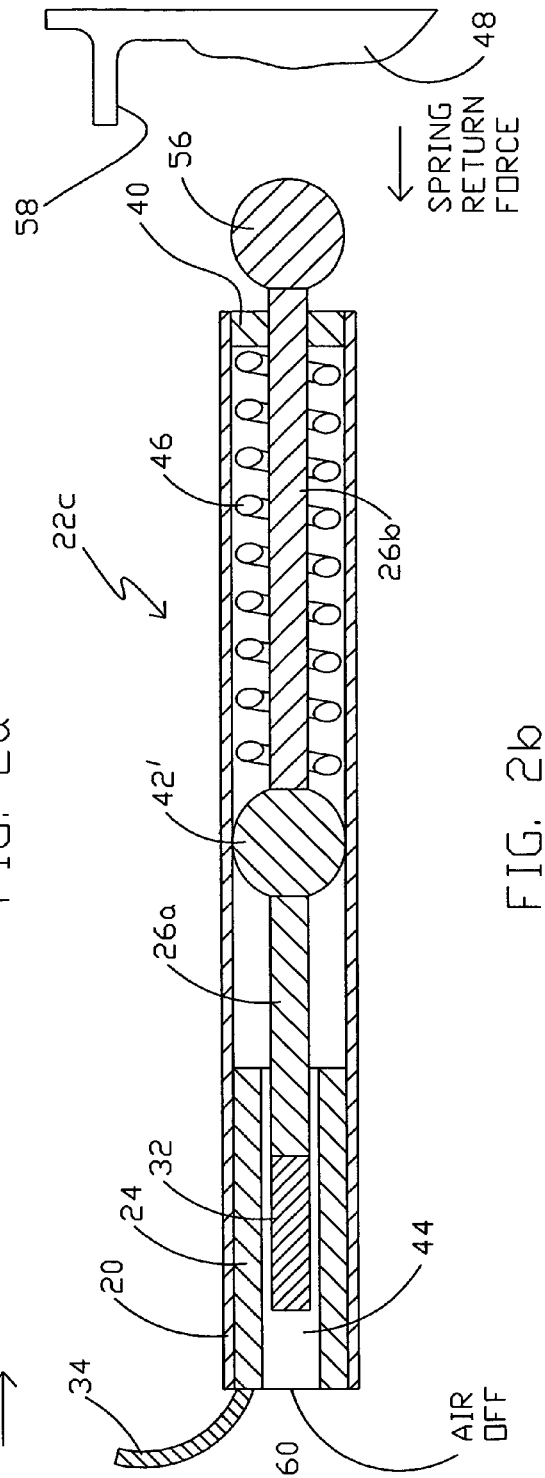
FIG. 2a
FIG. 2b

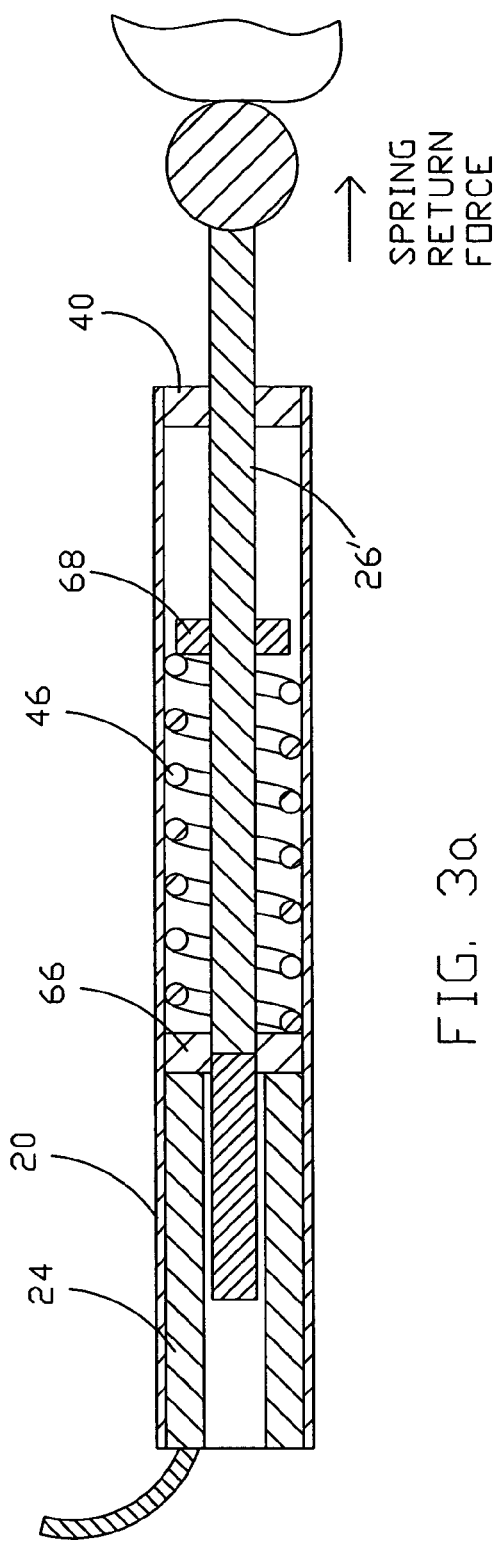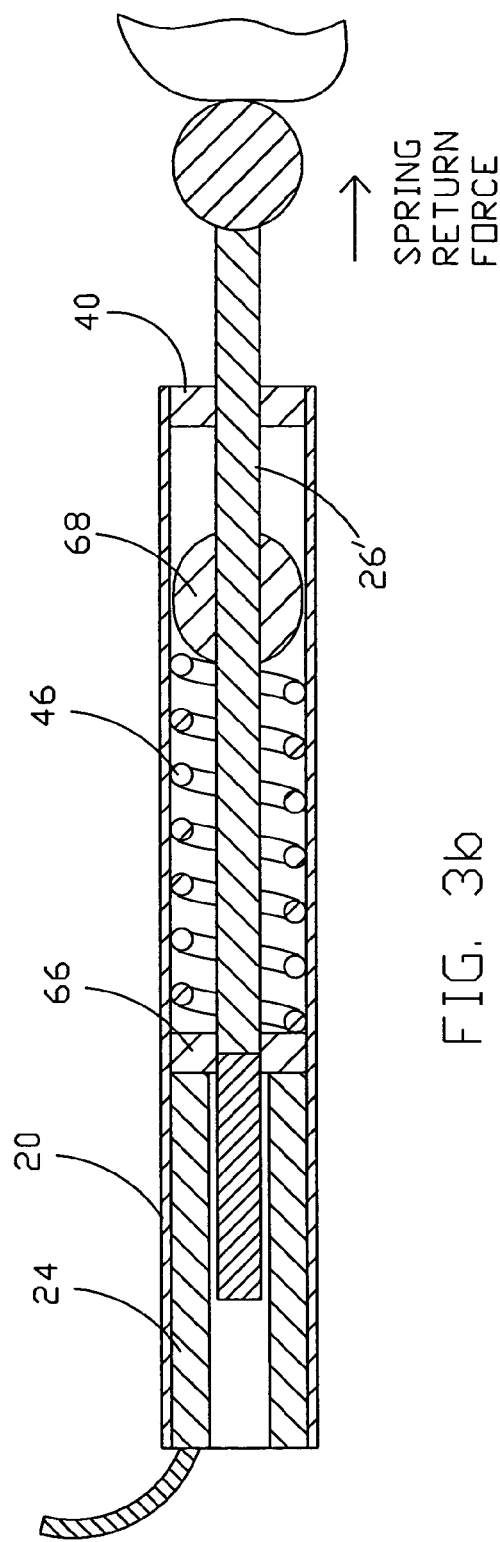

MICROMINIATURE GAUGING DISPLACEMENT SENSOR

RELATED APPLICATIONS

This patent application claims priority of Provisional Patent Applications 60/415,352 filed on Oct. 2, 2002, incorporated herein by reference. This application is a continuation-in-part of that Provisional Patent Application.

FIELD OF THE INVENTION

This invention generally relates to sensors. More particularly, it relates to displacement sensors. Even more particularly, it relates to miniature displacement sensors with captive cores.

BACKGROUND OF THE INVENTION

Displacement sensors have been used for gauging parts on an assembly line, for use in orthopaedic implants, such as artificial hips and knees, for use on civil structures, such as buildings, dams, and bridges, and for use on vehicles. They have been limited, however, because of the bulk of some of the sensors for some of these applications. Biomedical implants, for example, must be as small as possible. Small displacement sensors are available from MicroStrain, Inc., and they have been described in commonly assigned U.S. Pat. Nos. 5,914,593, 6,433,629, 6,499,368 and 6,622,567 to MicroStrain, Inc. Shrinking these designs has been hindered by the need to maintain mechanical integrity in the face of potential lateral forces that could bend the moveable core or prevent its easy axial movement into the coil of the displacement sensor. Such problems would seriously degrade measurement accuracy.

However, further miniaturization has been needed to provide displacement sensors in applications requiring even smaller sizes.

Thus, a better solution is needed to provide further miniaturization for applications requiring extremely small sizes while still providing resistance to lateral displacement and lateral rotation from lateral forces, and this solution is provided by the following invention.

SUMMARY OF THE INVENTION

It is therefore an object of the present invention to provide a scheme for reducing the size of displacement sensors having a captive core;

It is a further object of the present invention to provide a scheme for reducing the size of displacement sensors having a captive core while providing free axial movement for the core and while providing resistance to lateral forces;

It is a further object of the present invention to provide for an array of microminiature displacement sensors having reduced size;

It is a feature of the present invention that a pair of spaced bearings having an outer diameter matching an inner diameter of a housing provide resistance to lateral forces;

It is another feature the present invention that a pair of jewel bearings provides free axial movement for the core;

It is an advantage of the present invention that substantial reduction in size is achieved while maintaining free axial movement and improved resistance to lateral forces;

It is a further advantage of the present invention that a return spring is included to improve accuracy of displacement measurement; and It is a further advantage of the present invention that switched air actuation is included to allow the sensor to bypass obstacles.

These and other objects, features, and advantages of the present invention are accomplished with a device for providing displacement information. The device includes a housing holding a displacement sensor. The displacement sensor includes a coil and a captive core. An electrical measurement of the coil provides information about displacement of the core. The coil has an axis extending in a first direction, wherein the housing has a minimum outside dimension that is less than 3.00 mm when measured perpendicular to that first direction.

In another aspect the present invention is a device for providing displacement information. The device includes a housing having an inner surface having a housing-inside dimension. The housing is for holding a displacement sensor and a guidance mechanism. The displacement sensor includes a coil and a captive core having a core-outside dimension. The guidance mechanism includes a first bearing and a second bearing for guiding the core. The first bearing is connected to the housing. The first bearing has an axial hole having an axial hole dimension about equal to the core outside dimension. The core slidably extends through this axial hole. The second bearing has a second-bearing-outside dimension about equal to the housing-inside dimension. The guidance mechanism is for resisting lateral movement and lateral rotation of the core while allowing axial movement of the core into and out of the coil.

BRIEF DESCRIPTION OF THE DRAWINGS

The foregoing and other objects, features, and advantages of the invention will be apparent from the following detailed description of the invention, as illustrated in the accompanying drawings, in which:

FIG. 1a is a schematic cross sectional view of the microminiature displacement sensor of the present invention in its housing in which the displacement sensor includes a coil and a captured core, a return spring, a fixed bearing connected to the housing and a moveable bearing connected to the core that can be located next to the fixed bearing when the core is fully extended;

FIG. 1b is a schematic cross sectional view of the microminiature displacement sensor of the present invention in which the return spring is eliminated and a return force may be provided by gravity if the device is oriented with a downward component;

FIG. 2a is a schematic cross sectional view of the microminiature displacement sensor of the present invention in which the moveable bearing is located on an opposite side of the spring from the fixed bearing, the separation providing greater resistance to lateral forces, and in which air pressure compresses the spring and presses the core out against the object whose displacement is to be measured;

FIG. 2b is a schematic cross sectional view of the microminiature displacement sensor of FIG. 2a with the air pressure turned off, allowing the spring to force the core back into the housing to avoid a sharp lateral force from an extending portion of the object being measured;

FIG. 3a is a schematic cross sectional view of the microminiature displacement sensor of the present invention in which the moveable bearing has been replaced with two other parts, a second fixed bearing and a core capturing spring stop;

FIG. 3b is a schematic cross sectional view of the microminiature displacement sensor of the present invention in which the core capturing spring stop serves as a third bearing;

FIG. 4b is a cross sectional view of one sensor of the array of sensors of FIG. 4a; and FIG. 4c is a three dimensional detailed view of clamps shown in FIGS. 4a and 4b.

DETAILED DESCRIPTION OF THE PRESENT INVENTION

Figure 4A:
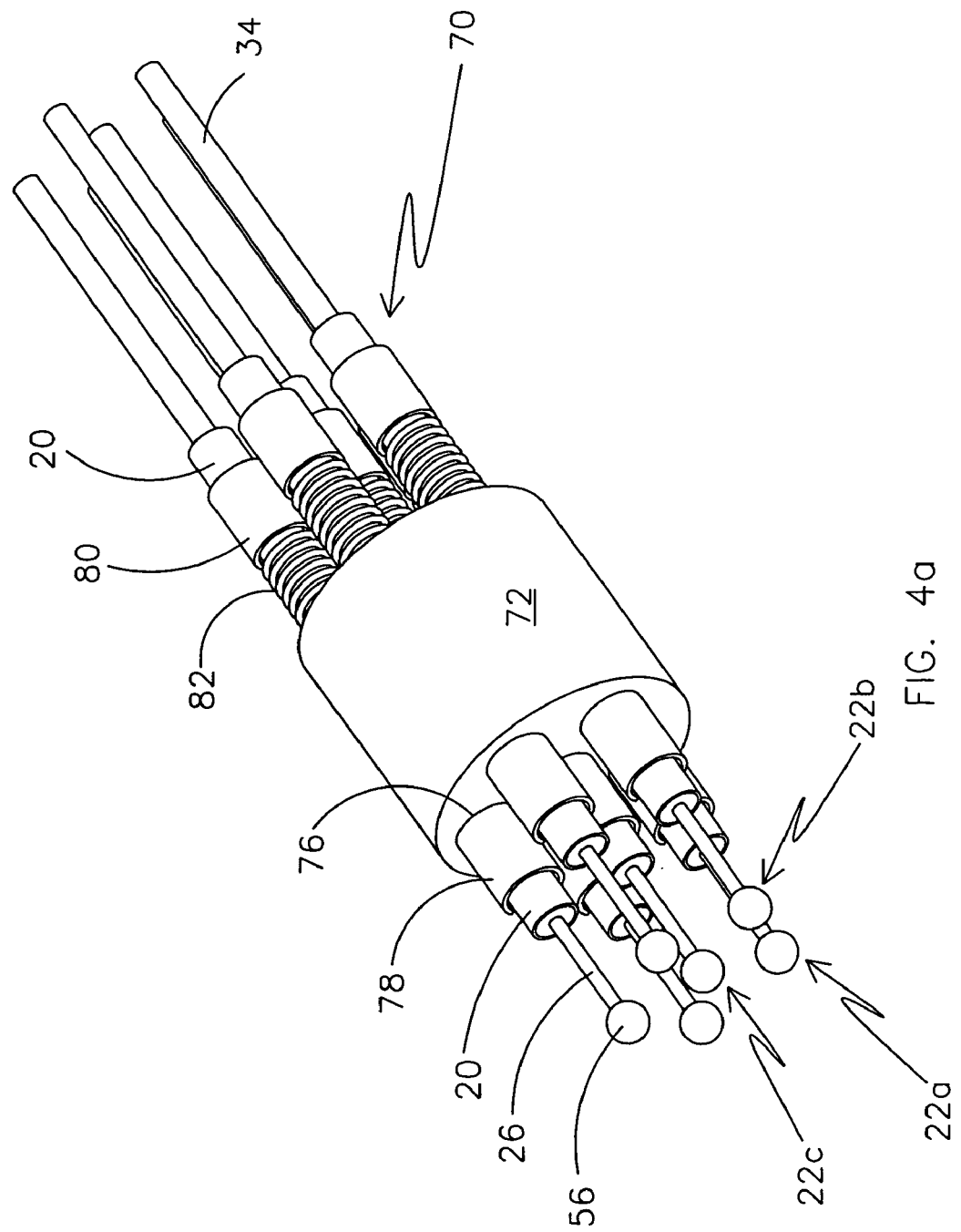
FIG. 4a is a three dimensional view of an array of sensors of the present invention.

The present invention substantially reduces the size of a displacement sensor with a captured core while maintaining low friction axial movement of the core and while improving resistance to lateral forces. The displacement sensors can used for gauging parts as they go by on a production line where the sensor may be subjected to lateral forces from the parts.

Cylindrical housing 20 of microminiature gauging displacement sensor 22a includes coil 24 and moveable core 26, as shown in FIG. 1a. Housing 20 is fabricated of stainless steel, titanium, or a ferromagnetic material such as martinsetic stainless steel. It could also be fabricated of a plastic or ceramic material. Cylindrical housing 20 has an outside diameter $D_o$ that can be as small as 1.4 mm. Other size housings can also be formed, including sizes in the range from about 1.4 mm to over about 3 mm including sizes as small as 1.6 mm, 1.8 mm, 2.0 mm, 2.5 mm, and 3.0 mm.

Moveable core 26 has a diameter of about 0.5 mm with a housing of 1.8 mm. Moveable core 26 has a diameter that approximately scales with the diameter of housing 20.

Coil 24 has windings of conductive wire, and is adhesively connected to housing 20 with epoxy. Coil 24 has opening 28 extending along coil axis 30. Core 26 is fabricated of an electrically conductive or a magnetic material. Alternatively, core 26 may have a conductive or magnetic portion 32, as shown in FIG. 1a. Movement of ferromagnetic, magnetic, or conductive, core 26 within opening 28 of coil 24 is detected as a change in reluctance of coil 24, by virtue of currents induced in coil 24, or by virtue of eddy currents induced in conductive core 26, which can all be measured in a circuit connected to coil 24 through wires in cable 34. Coil 24 may be a single coil, a dual coil, or three coils to provide the displacement reading, as is well known in the art. If core 26 is magnetic, coil 24 will detect velocity of core 26 rather than its displacement, and sensor 22a will become a velocity sensor. By differentiating the velocity signal over time or twice differentiating the displacement signal, the acceleration of core 26 can be determined. Displacement sensor 22a can also be used to provide other measurements that depend on displacement, velocity, or acceleration, such as strain or pressure. Cable 34 may have 2 to 4 wires for connection to the coil or coils in coil 24.

Core 26 may be fabricated of a material such as steel, stainless steel, titanium, aluminum, or plastic to provide resistance to bending under lateral forces. It can also be fabricated of a superelastic material, such as Nitinol to provide the ability to bend substantially without damage from lateral forces. Housing 20 may be fabricated of a ferromagnetic material which would facilitate shielding sensor 22a from external fields.

Core 26 can be a unitary shaft or portion 32 of core 26 may be fabricated of ferrite or another highly magnetic or conductive material. By fabricating core 26 of one material optimized for affecting coil 24 and a second material optimized for sliding and resisting negative effects of lateral forces, as shown in FIG. 1a, further advantage is achieved.

Core 26 is supported within housing 20 by fixed bearing 40 and moving bearing 42 to provide further resistance to lateral forces while permitting free axial movement of core 26 into air gap 44 in coil 24. Bearings 40, 42 allow core 26 to slide easily despite lateral forces and minimize axial friction while core 42 is subject to lateral forces. Fixed bearing 40 is connected to housing 20 at one end of housing 20. Moveable bearing 42 is connected to core 26 and moves along with core 26 within housing 20. Fixed bearing 40 is preferably cylindrical in shape. Moveable bearing 42 is ball shaped as shown in FIG. 1a, 1b but may also be cylindrically shaped.

Housing 20 can be drawn down to a smaller diameter at end 43 to hold bearing 40. Alternatively, housing 20 can start with a smaller diameter opening and it can be machined to provide a tight press fit for bearing 40. Drilling, reaming, or end milling can be used for this machining step. Glue or adhesive can also be provided to hold bearing 40 in place in housing 20 or bearing 40 can be soldered, brazed, or welded in place.

Displacement sensor 22a has a stroke length that is defined by the length of air gap 44 along axis 30 when bearing 42 is closest to fixed bearing 40.

Both fixed bearing 40 and moveable bearing 42 have outside diameters approximately matching inside diameter Di of housing 20. While fixed bearing 40 is connected to housing 20 to prevent its movement, moveable bearing 42 connected to core 26 can slide freely within housing 20 while receiving support from housing 20 to resist lateral forces on core 26. Fixed bearing 40 and moveable bearing 42 are fabricated of a material such as ruby or sapphire that provides for low friction movement of moveable bearing 42 along inner surface 52 of housing 20 or of core 26 within hole 54 of fixed bearing 40.

Moveable bearing 42 also serves as a spring stop for spring 46 that provides the return force on bearing 42 connected to core 26. The spring forces contact point 56 tightly against object 48 whose displacement is being measured. Provision of this return force improves accuracy of measurement of displacement of object 48 with respect to displacement sensor 22a. Spring 46 may be omitted, as shown in FIG. 1b, in which case the return force may be provided by gravity for displacement sensor 22b oriented vertically or at least having a downward component.

Displacement sensor 22a, 22b may have threads (not shown) along its outer surface 50 for attachment to another device (not shown) adjacent to object 48 to detect relative movement there between.

In another embodiment, when air pressure 60 is turned on, an pressurized air extends through coil 24 onto bearing 42' connected to core sections 26a, 26b, as shown in FIG. 2a. Bearing 42' and core sections 26a, 26b are driven out of displacement sensor 22c by this air pressure until spring 46 is compressed to equalize the force provided by air pressure 60 or until contact is made to object 48. The displacement measurement is performed with air pressure 60 turned on.

When air pressure 60 is turned off, spring 46 pushes bearing 42', core sections 26a, 26b, and contact point 56 away from object 48, as shown in FIG. 2b. This embodiment is particularly beneficial where object 48 is moving and has a shape that could apply sharp lateral forces on core 26b. For example, if object 48 is on a conveyor belt or otherwise moves past core 26b of displacement sensor 22b, portion 58 of object 48 would strike contact point 56 of displacement sensor 22c if not for the ability to turn off air pressure 60 and move contact point 56 out of the way. Turning air pressure 60 off allows spring 46 to retract core 26b to avoid such obstacles. Then air pressure 60 can be turned on again to make the next measurement.

Providing moveable bearing 42' with a cylindrical shape is particularly beneficial in an embodiment where air pressure 60 is provided since a cylindrically shaped bearing would better trap air and would better resist the flow of air than ball shaped bearing 42' which only has one line of contact with inner wall 50 of housing 20.

Providing bearing 42' spaced a larger distance from bearing 40, as in the embodiment of FIGS. 2a, 2b, provides advantage in resisting lateral forces that may be applied to core 26b where it extends from hole 54 in bearing 40. The wider spacing of the bearings provides substantially more resistance to lateral forces and lateral rotation than the embodiment with the closer spacing between bearings 40, 42 in the embodiment of FIGS. 1a, 1b where bearings 40, 42 are adjacent each other when core 26 is fully extended.

Providing different materials for core sections 26a, 26b on either side of moveable bearing 42 allows internal portion 26a to have different conductive, magnetic, or mechanical properties than external portion 26b. The two core 26a, 26b sections can each be joined to bearing 42' with a tight press fit or with an epoxy or glue.

Moveable bearing 42, 42' can be replaced with second fixed bearing 66 and with moveable core capturing spring stop 68. Fixed bearing 66 may be a jewel bearing comparable to bearings 40, 42. Fixed bearing 66 is connected to coil 24 or to housing 20 to hold it in a fixed position. Core capturing spring stop 68 is connected to core 26', as shown in FIG. 3a, so that it moves with core 26'. This embodiment provides advantage in resistance to lateral forces because of the greater spacing between bearings 40 and 66. However, one additional part is needed since the two roles of bearing 66 and core capturing spring stop 68 were provided by one bearing 42, 42' in FIGS. 1a, 2a, 2b.

By connecting fixed bearing 66 to coil 24 before it is inserted in housing 20, fixed bearing 66 can be precisely positioned. In this embodiment, core capturing spring stop 68 is positioned at a location along the length of core 26' so that when core 26' is fully extended and core capturing spring stop 68 contacts bearing 40, a portion of core 26' still extends through fixed bearing 66.

Core capturing spring stop 68 can be smaller than inner diameter $D_i$, as shown in FIG. 3a. Or core capturing spring stop 68 can have a diameter equal to inner diameter $D_i$, so it acts similarly to bearing 42 (FIG. 1a), to provide yet a third bearing within housing 20, as shown in FIG. 3b. Such a third bearing provides even greater support for core 26 and improves its ability to move axially within housing 20 and within coil 24 in the presence of lateral forces. Thus, the embodiment of FIG. 3 facilitates further reducing resistance to axial movement that may arise from lateral forces on core 26, and permits displacement sensor 22c and core 26 to be even smaller.

It is also possible to provide a sleeve within coil 24 to provide the second bearing. However, this approach is likely to have greater friction than provision of jewel bearing 42, 42', 66.

Figures 4B, 4C:
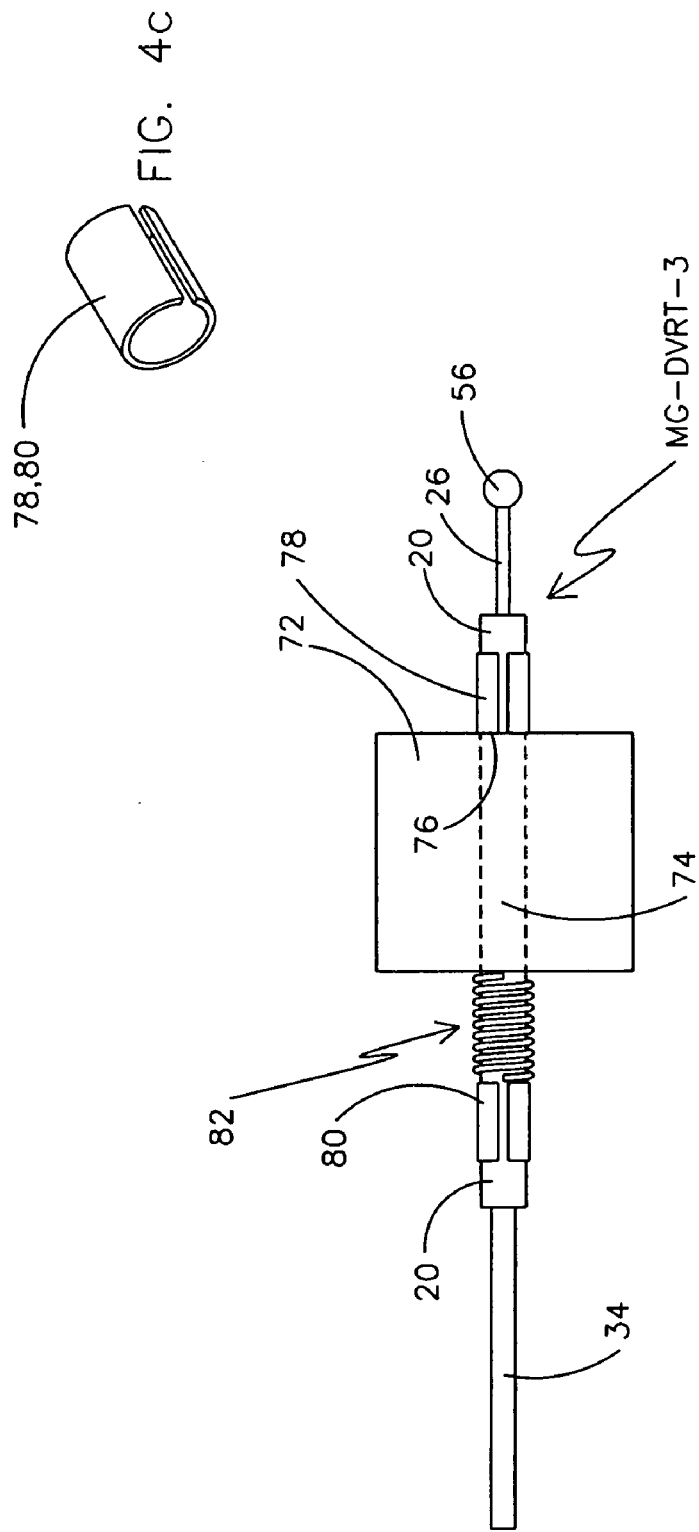

Array of sensors 70 can be provided as shown in FIG. 4a. Each sensor 22a, 22b, 22c of array 70 is held in position with mounting block 72 having straight through holes 74, as shown in FIG. 4b. End 76 of clamp 78 that grips housing 20 of each sensor in array of sensors 70 and defines location of each sensor 22a, 22b, 22c of array 70 with respect to mounting block 72. Clamp 80 and compression spring 82 force mounting block 72 against clamp 78. A detailed view of clamps 78, 80 is provided in FIG. 4c. In array of sensors 70, sensors 22a, 22b, 22c can be closely packed with a center to center spacing of contact points 56 that is about equal to the outside diameter of clamp 78 or 80 or compression spring 82, whichever is larger. Alternatively, sensors 22a, 22b, 22c can be potted together without clamps so that the center to center spacing of contact points 56 is equal to the outside diameter $D_o$ of housing 20.

While several embodiments of the invention, together with modifications thereof, have been described in detail herein and illustrated in the accompanying drawings, it will be evident that various further modifications are possible without departing from the scope of the invention. The various embodiments can be combined in various ways. For example spring stop 68 can used to provide core 26' out of two different materials, as shown for bearing 42' in FIGS. 2a, 2b. Nothing in the above specification is intended to limit the invention more narrowly than the appended claims. The examples given are intended only to be illustrative rather than exclusive.

What is claimed is:

1. A device, comprising a housing holding a sensor, said housing having an inner surface, said inner surface having an inner-surface-inside dimension, said sensor including a coil and a captive core, wherein said coil has a coil inside diameter, wherein an electrical measurement of said coil provides information about at least one from the group including displacement of said captive core and velocity of said captive core, further wherein said coil has an axis extending in a first direction, wherein said housing has a minimum outside dimension that is less than 3.00 mm when measured perpendicular to said first direction, wherein said housing further comprises a support for said captive core, wherein said housing inner-surface-inside dimension is greater than said coil inside diameter, wherein said support includes a first bearing and a second bearing, wherein said captive core has a stroke length, wherein said captive core has a first length of contact with said first bearing, wherein said captive core has a second length of contact with said second bearing, wherein said first length of contact is less than said stroke length and wherein said second length of contact is less than said stroke length, wherein said second bearing has a second-bearing-outside diameter that is greater than said coil inside diameter.

2. A device as recited in claim 1, wherein said housing has a minimum outside dimension that is less than 2.50 mm when measured perpendicular to said first direction.

3. A device as recited in claim 1, wherein said housing has a minimum outside dimension that is less than 2.00 mm when measured perpendicular to said first direction.

4. A device as recited in claim 1, wherein said housing has a minimum outside dimension that is less than 1.80 mm when measured perpendicular to said first direction.

5. A device as recited in claim 1, wherein said housing has a minimum outside dimension that is less than 1.60 mm when measured perpendicular to said first direction.

6. A device as recited in claim 1, wherein said housing has a minimum outside dimension that is less than 1.40 mm when measured perpendicular to said first direction.

7. A device as recited in claim 1, wherein said captive core extends into said coil.

8. A device as recited in claim 1, wherein said captive core has a first portion having a first diameter, wherein said captive core further includes a second portion having a diameter greater than said first diameter for retaining said core within said housing.

9. A device as recited in claim 8, wherein said first bearing is connected to said housing, wherein said core slides within a hole in said first bearing.

10. A device as recited in claim 8, wherein said second bearing is mechanically mounted to at least one from the group including said coil and said housing, wherein said core slides within a first hole in said first bearing and wherein said core slides within a second hole in said second bearing.

11. A device as recited in claim 10, wherein said core extends out from said housing from said first bearing, wherein said second bearing is spaced a distance from said first bearing to provide said resistance to lateral forces on said core where said core extends from said housing while allowing free axial movement of said core.

12. A device as recited in claim 8, wherein said second bearing is integral with said second portion and mechanically connected to said core, wherein said second bearing moves with said core.

13. A device as recited in claim 12, wherein said first bearing and said second bearing are jewel bearings.

14. A device as recited in claim 12, wherein said captive core comprises steel, stainless steel, titanium, aluminum, plastic, or a super-elastic material.

15. An sensor as recited in claim 14, wherein said super-elastic material comprises nitinol.

16. A device as recited in claim 1, wherein said displacement or velocity sensor comprises an inductive sensor or an eddy current sensor.

17. A device as recited in claim 16, wherein said inductive sensor or said eddy current sensor is a one-coil device.

18. A device as recited in claim 16, wherein said inductive sensor or said eddy current sensor is a two-coil device.

19. A device as recited in claim 16, wherein said inductive sensor or said eddy current sensor is a three-coil device.

20. A device as recited in claim 1, wherein said sensor further comprises a spring to provide a return force to said core.

21. A device as recited in claim 20, wherein said core extends through said spring and into said coil.

22. A device as recited in claim 20, wherein said core further comprises a core stop to capture said core within said housing, wherein said core stop further limits extension of said spring.

23. A device as recited in claim 22, wherein said housing has a housing inside diameter, and wherein said core stop is sized to have an outside diameter approximately equal to said housing inside diameter to provide a bearing function for guiding said core.

24. A device as recited in claim 1, wherein said core includes a ferromagnetic material.

25. A device as recited in claim 24, wherein said ferromagnetic portion comprises iron, nickel, ferrite, or steel.

26. A device as recited in claim 1, wherein said core further comprises a contact point for making contact with an object to be measured, wherein said contact point is made of a hard material that resists wear.

27. A device as recited in claim 26, wherein said hard material comprises alumina, ruby, sapphire or hardened steel.

28. A device as recited in claim 1, further comprising lead wires electrically connected to said coil and extending to a circuit.

29. A device as recited in claim 1, wherein said captive core comprises a super-elastic material.

30. An sensor as recited in claim 29, wherein said super-elastic material comprises nitinol.

31. A device as recited in claim 1, wherein said first bearing includes a jewel bearing and wherein said second bearing includes a jewel bearing.

32. A device for providing displacement information, comprising a housing having an inner surface, said inner surface having an inner-surface-inside dimension, said housing holding a displacement sensor and a guidance mechanism, said displacement sensor including a coil and a captive core, said coil having a coil inside diameter, said captive core having a core-outside dimension, wherein said guidance mechanism comprises a first bearing and a second bearing for guiding said core, wherein said first bearing is connected to said housing, wherein said first bearing has an axial hole having an axial-hole dimension about equal to said core-outside dimension, wherein said core slidably extends through said axial hole, wherein said second bearing has a second-bearing-outside dimension about equal to said inner-surface-inside dimension, wherein said guidance mechanism is for resisting lateral movement of said core while allowing axial movement of said core into and out of said coil, wherein said inner-surface-inside dimension is greater than said coil inside diameter, wherein said captive core has a stroke length, wherein said captive core has a first length of contact with said first bearing, wherein said captive core has a second length of contact with said second bearing, wherein said first length of contact is less than said stroke length and wherein said second length of contact is less than said stroke length.

33. A device as recited in claim 32, wherein said second bearing is connected to said captive core.

34. A device as recited in claim 32, wherein said second bearing is connected to said housing.

35. A device as recited in claim 32, wherein said second bearing is connected to said coil.

36. A device as recited in claim 32, wherein said coil has an axis extending in a first direction, wherein said housing has a housing outside dimension, wherein said housing has a minimum outside dimension that is less than 3.00 mm when measured perpendicular to said first direction.

37. A device as recited in claim 32, further comprising a spring for spring loading said core.

38. A device as recited in claim 32, wherein said captive core comprises a super-elastic material.

39. An sensor as recited in claim 38, wherein said super-elastic material comprises nitinol.

40. A device as recited in claim 32, wherein said first bearing includes a jewel bearing and wherein said second bearing includes a jewel bearing.

41. A system for providing displacement or velocity information, comprising an array of sensors, each said sensor capable of providing a measurement of at least one from the group consisting of displacement and velocity, wherein said sensors are on center to center spacing of less than 3 mm, wherein each said sensor includes a housing holding a coil, a captive core, and a plurality of bearings, wherein said bearings are for supporting said captive core, further wherein said coil has an axis extending in a first direction, wherein said coil has a coil inside diameter, wherein said captive core extends into said coil, wherein each said bearing has a bearing outside diameter that is greater than said coil inside diameter, wherein said captive core has a stroke length, wherein each said bearing has a length-of-contact in said first direction with a surface capable of movement in said first direction relative to said bearing that is less than said stroke length.

42. A device as recited in claim 41, wherein said captive core comprises a super-elastic material.

43. An sensor as recited in claim 42, wherein said super-elastic material comprises nitinol.

44. A device as recited in claim 41, wherein each of said plurality of bearings includes a jewel bearing.

45. A device as recited in claim 44, wherein said captive core comprises a super-elastic material.

46. An sensor as recited in claim 45, wherein said super-elastic material comprises nitinol.

47. A device, comprising a sensor capable of providing a measurement of at least one from the group consisting of displacement and velocity, wherein said sensor includes a housing holding a coil, a captive core, and a plurality of bearings, wherein said bearings are for supporting said captive core, further wherein said coil has an axis extending in a first direction, wherein said coil has a coil inside diameter, wherein each said bearing has a bearing outside diameter that is greater than said coil inside diameter, wherein said captive core has a stroke length, wherein each said bearing has a length-of-contact in said first direction with a surface capable of movement in said first direction relative to said bearing that is less than said stroke length.

48. A device as recited in claim 47, wherein said sensor further comprises a spring to provide a return force to said captive core.

49. A device as recited in claim 47, wherein each of said plurality of bearings includes a jewel bearing.

50. A device as recited in claim 47, wherein said captive core comprises a super-elastic material.

51. An sensor as recited in claim 50, wherein said super-elastic material comprises nitinol.

* * * * *